3,256,147
N-NITROSO-N-LOWER ALKYL-HALOANILINES
AS NEMATOCIDES
Werner Meiser, Wuppertal-Elberfeld, and Bernhard Homeyer, Opladen, Germany, assignors to Farbenfabriken Bayer Aktiengesellschaft, Leverkusen, Germany, a German corporation
No Drawing. Filed Sept. 15, 1964, Ser. No. 396,730
10 Claims. (Cl. 167—30)

The present invention relates to the use as nematocides of partly known nuclear-halogenated aromatic N-nitroso-N-alkylamines. The effect of these compounds on nematodes has hitherto not been known.

Various classes of compounds are already known for combating nematodes, especially halogen compounds with a low vapour pressure, such as ethylene dibromide or mixtures of dichloropropene and dichloropropane.

One object of the present invention consists in providing nematocidal agents which have a wide spectrum of activity. Another object of the invention consists in making available a new group of chemical substances as active ingredients for nematocidal agents. Further objects can be seen from the following description and the examples.

It has now been found that the partly known nuclear-halogenated aromatic N-nitroso-N-alkylamines of the formula

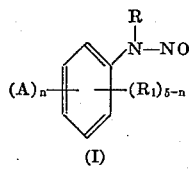

(I)

in which

R stands for lower alkyl,
$R_1$ stands for hydrogen, alkyl, alkoxy, alkylmercapto and/or nitro,
A stands for halogen and/or trihalomethyl, and
n stands for 1–4 possess nematocidal properties.

It must be called definitely surprising that the nuclear-halogenated aromatic N-nitroso-N-alkylamines to be used according to the invention have strong nematocidal properties, since it has hitherto not been known that compounds of similar chemical structure act as nematocides.

The substances to be used according to the invention are clearly characterised by the above-mentioned formula I. In this formula R preferably stands for lower alkyl with 1–6 carbon atoms; A preferably stands for chlorine, bromine, fluorine and for methyl which is completely substituted by chlorine, bromine and/or fluorine; $R_1$ preferably stands for hydrogen, alkyl with 1–4 carbon atoms, alkoxy with 1–4 carbon atoms, alkylmercapto with 1–4 carbon atoms and/or nitro; n preferably stands for 1–3.

Examples of substances to be used according to the invention are:

N-nitroso-N-methyl-2-chloro-aniline ---------------------- B.P. 89° C./ 1.2 mm. Hg.
N-nitroso-N-methyl-3-chloro-aniline ---------------------- M.P. 35° C.
N-nitroso-N-methyl-4-chloro-aniline ---------------------- M.P. 51° C.
N-nitroso-N-methyl-3,4-dichloro-aniline ---------------------- M.P. 48° C.
N-nitroso-N-methyl-2,4-dichloro-aniline ---------------------- M.P. 54° C.
N-nitroso-N-methyl-2,3-dichloro-aniline ---------------------- B.P. 122° C./ 0.1 mm. Hg.
N-nitroso-N-methyl-2,5-dichloro-aniline ---------------------- M.P. 66° C.
N-nitroso-N-methyl-2,6-dichloro-aniline.
N-nitroso-N-methyl-3,4,5-trichloro-aniline.
N-nitroso-N-methyl-3,4,6-trichloro-aniline ---------------------- M.P. 61° C.
N-nitroso-N-methyl-3,5-dichloro-aniline ---------------------- B.P. 108–112° C./ 0.05 mm. Hg.
N-nitroso-N-ethyl-2-chloro-aniline ---------------------- B.P. 89–92° C./ 0.05 mm. Hg.
N-nitroso-N-ethyl-3-chloro-aniline ---------------------- B.P. 86° C./ 0.03 mm. Hg.
N-nitroso-N-ethyl-4-chloro-aniline ---------------------- M.P. 60° C.
N-nitroso-N-ethyl-3,4-dichloro-aniline.
N-nitroso-N-ethyl-2,4-dichloro-aniline ---------------------- B.P. 110–113° C./ 0.05 mm. Hg.
N-nitroso-N-ethyl-2,3-dichloro-aniline ---------------------- B.P. 124–126° C./ 0.1 mm. Hg.
N-nitroso-N-ethyl-2,5-dichloro-aniline.
N-nitroso-N-ethyl-2,6-dichloro-aniline.
N-nitroso-N-ethyl-3,4,5-trichloro-aniline.
N-nitroso-N-ethyl-3,4,6-trichloro-aniline.
N-nitroso-N-methyl-2-fluoro-aniline ---------------------- B.P. 77–79° C./ 1 mm. Hg.
N-nitroso-N-methyl-3-fluoro-aniline ---------------------- B.P. 77–78° C./ 1 mm. Hg.
N-nitroso-N-methyl-4-fluoro-aniline ---------------------- B.P. 78–80° C./ 0.05 mm. Hg.
N-nitroso-N-methyl-2-bromo-aniline.
N-nitroso-N-methyl-3-bromo-aniline ---------------------- M.P. 44° C.
N-nitroso-N-methyl-4-bromo-aniline ---------------------- M.P. 70° C.
N-nitroso-N-ethyl-4-bromo-aniline ---------------------- M.P. 64° C.
N-nitroso-N-methyl-2,4-dibromo-aniline ---------------------- M.P. 50° C.
N-nitroso-N-methyl-2,5-dibromo-aniline ---------------------- M.P. 87° C.
N-nitroso-N-methyl-3-trifluoromethyl aniline.
N-nitroso-N-methyl-4-chloro-2-trifluoromethyl aniline -------- B.P. 86° C./ 0.05 mm. Hg.
N-nitroso-N-methyl-4-chloro-2-methylaniline ---------------- B.P. 106° C./ 0.05 mm. Hg.
N-nitroso-N-propyl-2-chloro-aniline ---------------------- B.P. 92–93° C./ 0.05 mm. Hg.

N-nitroso-N-isopropyl-2-chloro-
aniline _____ B.P. 95–98° C./
0.1 mm. Hg.
N-nitroso-N-butyl-2-chloro-
aniline _____ B.P. 116° C./
0.3 mm. Hg.
N-nitroso-N-isobutyl-2-chloro-
aniline _____ B.P. 108–110° C./
0.1 mm. Hg.
N-nitroso-N-tert.-butyl-2-chloro-
aniline _____ B.P. 104–106° C./
0.05 mm. Hg.
N-nitroso-N-propyl-3-chloro-
aniline _____ B.P. 97–100° C./
0.1 mm. Hg.
N-nitroso-N-isopropyl-3-chloro-
aniline _____ B.P. 97–98° C./
0.1 mm. Hg.
N-nitroso-N-butyl-3-chloro-
aniline _____ B.P. 114–116° C./
0.2 mm. Hg.
N-nitroso-N-isobutyl-3-chloro-
aniline _____ B.P. 106–108° C./
0.05 mm. Hg.
N-nitro-N-tert.-butyl-3-chloro-
aniline _____ B.P. 106–108° C./
0.1 mm. Hg.
N-nitroso-N-propyl-polychloro-
anilines.
N-nitroso-N-propyl-4-chloroaniline.
N-nitroso-N-isopropyl-4-chloro-
aniline.
N-nitroso-N-butyl-4-chloro-
aniline _____ B.P. 134° C./
0.3 mm. Hg.
N-nitroso-N-isobutyl-4-chloro-
aniline.
N-nitroso-N-tert.-butyl-4-chloro-
aniline.
N-nitroso-N-butyl-polychloro-
anilines.
N-nitroso-N-pentyl-chloroanilines.
N-nitroso-N-isopentyl-chloro-
anilines.

Most compounds to be used according to the invention and their production are known (see e.g. Ber. 49, p. 2195; Ann. 416, p. 191; Ber. 53, p. 1542; Ber. 54, p. 1415 etc.)

Those compounds which are not known can easily be prepared from the corresponding N-monoalkyl anilines by introducing the nitroso group by means of sodium nitrite and acid, or with nitrous gases (see e.g. Ber. 49, p. 2195). Crude N-alkyl anilines as are obtained, for example, from anilines and dialkyl sulphates or alkyl halides possibly in water or in inert solvents, can also be used for this purpose. The production from dialkyl anilines with tetranitromethane in the presence of pyridine constitutes another method (see e.g. Ber. 53, p. 537).

The substances to be used according to the invention have strong nematocidal properties but a relatively low toxicity towards warm-blooded animals and can therefore be used for combating nematodes, especially phytopathogenic nematodes. These comprise mainly leaf nematodes (Aphelenchoides) such as the chrysanthemum eelworm (*A. ritzemabosi*), the strawberry eelworm (*A. fragariae*), the rice eelworm (*A. oryzae*); stalk nematodes (Ditylenchus), such as the stem eelworm (*D. dipsaci*); root gall nematodes (Meloidogyne), such as *M. arenaria* and *M. incognita*; cyst-forming nematodes (Heterodera), such as the potato nematode (*H. rostochiensis*), the beet nematode (*H. schachtii*); and free-living root nematodes, for example, those of the genera Pratylenchus, Paratylenchus, Rotylenchus, Xiphinema and Radopholus.

The compounds according to the invention can be worked up into the customary formulations, such as emulsifiable concentrates, spray powders, pastes, soluble powders, dusts and granulates. These are prepared in the usual manner, for example by extending the active compounds with solvents and/or carrier substances, optionally with the use of emulsifiers and/or dispersing agents (cf. Agricultural Chemicals, March 1960, pages 35–38). Suitable auxiliaries are mainly: solvents, such as aromatics (e.g. xylene, benzene), chlorinated aromatics (e.g. chlorobenzenes), paraffins (e.g. petroleum fractions), alcohols (e.g. methanol, butanol), amines (e.g. ethanolamine, dimethyl formamide), and also water; carrier substances, such as natural stone powders (e.g. kaolins, aluminas, talk, chalk) and synthetic stone powders (e.g. highly dispersed silicic acid, silicates); emulsifiers, such as non-ionic and anionic emulsifiers (e.g. polyoxyethylene fatty acid esters, polyoxyethylene fatty alcohol ethers, alkyl sulphonates and aryl sulphonates); and dispersing agents, such as lignin, sulphite waste liquors and methyl cellulose.

The active compounds according to the invention can be present in the formulations in admixture with other know active substances.

The formulations generally contain between 0.1 and 95, preferably between 0.5 and 90, percent by weight of active compound.

The substances according to the invention can be used as such, in the form of their compositions or in the form prepared therefrom for application. They are applied in the usual manner, for example by atomizing, spraying or injection.

The following examples are given for the purpose of illustrating the invention.

EXAMPLE 1

2.34 kg. of N-methyl-o-chloroaniline are allowed to run into 15 litres of water and 3.66 litres of concentrated hydrochloric acid. After cooling to +5° C., the nitroso group is introduced by means of 1.164 kg. of sodium nitrite in 3 litres of water, while cooling. After further stirring for 2 hours, the separated oil is taken up in methylene chloride. The methylene chloride solution is shaken with a soda solution and water. After drying over potassium hydroxide, the solvent is evaporated and the residue distilled. 2.528 kg. of N-nitroso-N-methyl-2-chloroaniline are thus obtained in the form of a yellow oil of boiling point 89° C. at 1.2 mm. Hg.

EXAMPLE 2

55.5 g. of 4-fluoroaniline (0.5 mol) are dissolved in 175 cc. of absolute ether, and 24 cc. of dimethyl sulphate are added dropwise. The mixture is subsequently boiled for 6 hours. The precipitated 56 g. of p-fluoroaniline methosulphate are filtered off with suction. The mother liquor is distilled off and yields 30.5 g. of crude N-methyl-4-fluoroaniline. This is dissolved in 50 cc. of concentrated hydrochloric acid and 100 cc. of water, and the nitroso group is introduced at below +10° C. by means of 17 g. of sodium nitrite in water. The precipitated oil is taken up in methylene chloride, neutralised with a soda solution, and the methylene chloride solution is dried over potassium hydroxide. After distilling off the solvent, the residue is distilled. 20 g. of N-nitroso-N-methyl-4-fluoroaniline are thus obtained in the form of a yellow oil of boiling point 78–80° C. at 0.05 mm. Hg.

EXAMPLE 3

158 g. of 5-chloro-2-amino-benzotrifluoride are heated in 280 cc. of dry benzene at boiling temperature for several hours. The benzene is distilled off in a vacuum. The residue is digested with petroleum ether whereupon the methosulphate of the starting material crystallises out. The latter is filtered off with suction, the petroleum ether evaporated, the residue dissolved in 94 cc. of concentrated hydrochloric acid and, after cooling to below −10° C., the nitroso group is introduced with 16.3 g. of sodium nitrite in water. The separated oil is taken up in methylene chloride, neutralised with a soda solution, and the solution is dried. After distillation, the N-nitroso-N-methyl-2-trifluoromethyl-4-chloroaniline is thus obtained in the form of a yellow oil of boiling point 86° C. at 0.05 mm. Hg.

EXAMPLE 4

200 g. of 2-chloroaniline and 107.5 g. of n-butyl bromide are kept in a bath at 120° C. for 20 hours. After cooling, the crystalline precipitate of 2-chloroaniline hydrobromide is treated with dry ether and filtered off with suction (150 g.). The ether is extracted several times with water and distilled off in a vacuum. 148 g. of crude N-n-butyl aniline are thus obtained, which are dissolved in 230 cc. of hydrochloric acid and 300 cc. of water, and the nitroso group is introduced at below +10° C. by means of 69 g. of sodium nitrite in water. The precipitated oil is taken up in methylene chloride, neutralised with a soda solution and the solution dried over potassium hydroxide. After distilling off the solvent, the residue is distilled. 130 g. of N-nitroso-N-n-butyl-2-chloroaniline are thus obtained in the form of a yellow oil of boiling point 116° C. at 0.3 mm. Hg.

*Example A.—Critical concentration test*

Test nematode: Meloidogyne spec.
Solvent: 30 parts by weight xylene.
Emulsifier: 20 parts by weight alkylaryl polyglycol ether.

To produce a suitable preparation of the active compound, 1 part by weight of the active compound is mixed with the stated amount of solvent, the stated amount of emulsifier is added and the concentrate then diluted with water to the desired concentration.

The preparation of the active compound is intimately mixed with soil which is heavily infested with the test nematodes. The concentration of the active compound in the preparation is practically of no importance, only the amount of active compound per unit volume of soil, given in p.p.m., being decisive. The soil is filled into pots, sown with lettuce and then kept at a greenhouse temperature of 27° C. After 4 weeks, the lettuce roots are examined for infestation with nematodes and the degree of effectiveness of the active compound is determined as a percentage. The degree of effectiveness is 100% when infestation is completely prevented and 0% when the infestation is exactly the same as that of the control plants in untreated soil which has been infested in the same manner.

The active compounds, the amounts applied and the results obtained can be seen from the following table:

| Active compound | Degree of effectiveness in % with amounts of— | | | |
|---|---|---|---|---|
| | 200 p.p.m. | 100 p.p.m. | 50 p.p.m. | 25 p.p.m. |
| 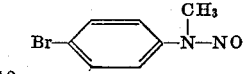 | 100 | 100 | 100 | 100 |
| 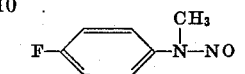 | 100 | 100 | 100 | 98 |
|  | 100 | 100 | 100 | 100 |
| 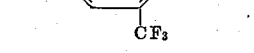 | 100 | 100 | 100 | 100 |
| 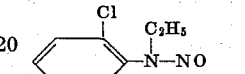 | 100 | 100 | 100 | 50 |
| 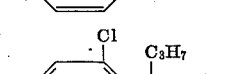 | 98 | 0 | 0 | 0 |
| 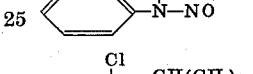 | 100 | 50 | 0 | 0 |
| 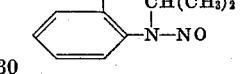 | 100 | 50 | 0 | 0 |
| 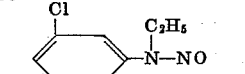 | 100 | 100 | 100 | 100 |
| 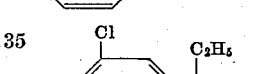 | 100 | 100 | 100 | 80 |
| 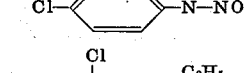 | 100 | 100 | 100 | 90 |
| 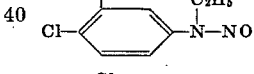 | 100 | 100 | 100 | 100 |
| 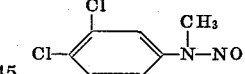 | 100 | 100 | 100 | 98 |
| 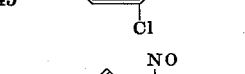 | 100 | 100 | 100 | 90 |
| 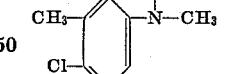 | 100 | 100 | 90 | 50 |
| 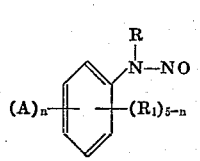 | 100 | 100 | 100 | 100 |

We claim:
1. A method for controlling nematodes which comprises applying to said nematodes an effective amount of a compound of the formula

$$\underset{(A)_n}{\underset{\bigg|}{\bigcirc}}\!\!-\!\!\underset{(R_1)_{5-n}}{\underset{\bigg|}{\overset{R}{\underset{|}{N}}\!-\!NO}}$$

in which
R is lower alkyl of 1–6 carbon atoms;
R₁ is a member selected from the group consisting of hydrogen, alkyl of 1–4 carbon atoms, alkoxy of 1–4 carbon atoms, and nitro;

A is a member selected from the group consisting of chloro, bromo, fluoro and trihalomethyl; and n is an integer of 1–4.

2. A method for controlling nematodes which comprises applying to said nematodes an effective amount of a compound of the formula

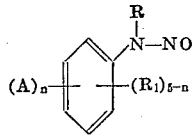

wherein R is an alkyl of 1–2 carbon atoms, $R_1$ is hydrogen, A is chloro and n is an integer of 1–4.

3. A method for controlling nematodes which comprises applying to said nematodes an effective amount of a compound of the formula

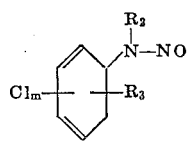

wherein $R_2$ stands for lower alkyl with 1–2 carbon atoms,
$R_3$ stands for lower alkyl with 1–2 carbon atoms and
m stands for 1–2.

4. A method for controlling nematodes which comprises applying to said nematodes an effective amount of a compound of the formula of claim 3 wherein $R_2$ is lower alkyl of 1–2 carbon atoms; $R_3$ is alkoxy of 1–2 carbon atoms; and m is an integer of 1–2.

5. A method for controlling nematodes which comprises applying to said nematodes an effective amount of a compound of the formula

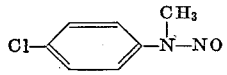

6. A method for controlling nematodes which comprises applying to said nematodes an effective amount of a compound of the formula

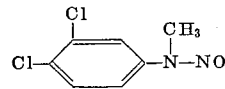

7. A method for controlling nematodes which comprises applying to said nematodes an effective amount of a compound of the formula

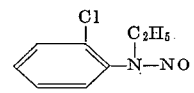

8. A method for controlling nematodes which comprises applying to said nematodes an effective amount of a compound of the formula

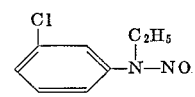

9. A method for controlling nematodes which comprises applying to said nematodes an effective amount of a compound of the formula

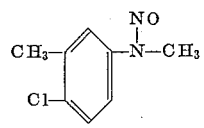

10. A method for controlling nematodes which comprises applying to said nematodes an effective amount of a compound of the formula

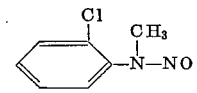

No references cited.

JULIAN S. LEVITT, *Primary Examiner.*

VERA C. CLARKE, *Assistant Examiner.*